Nov. 10, 1964 — C. C. ROBINSON — 3,156,603
TAPE DISPENSER
Filed Jan. 2, 1962 — 2 Sheets-Sheet 1

INVENTOR.
CLIFFORD C. ROBINSON
BY Fishburn & Gold,
ATTORNEYS

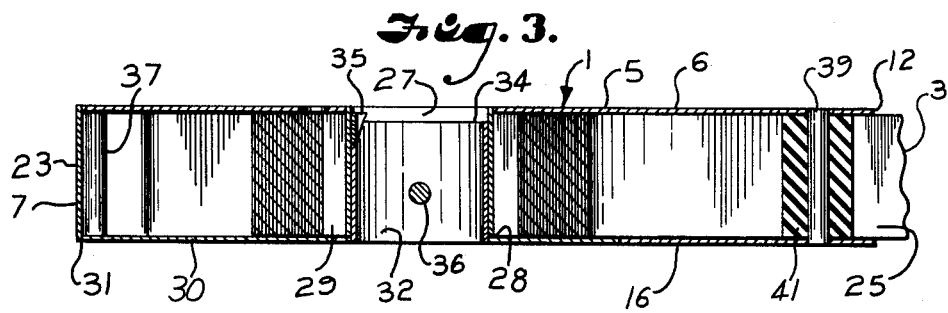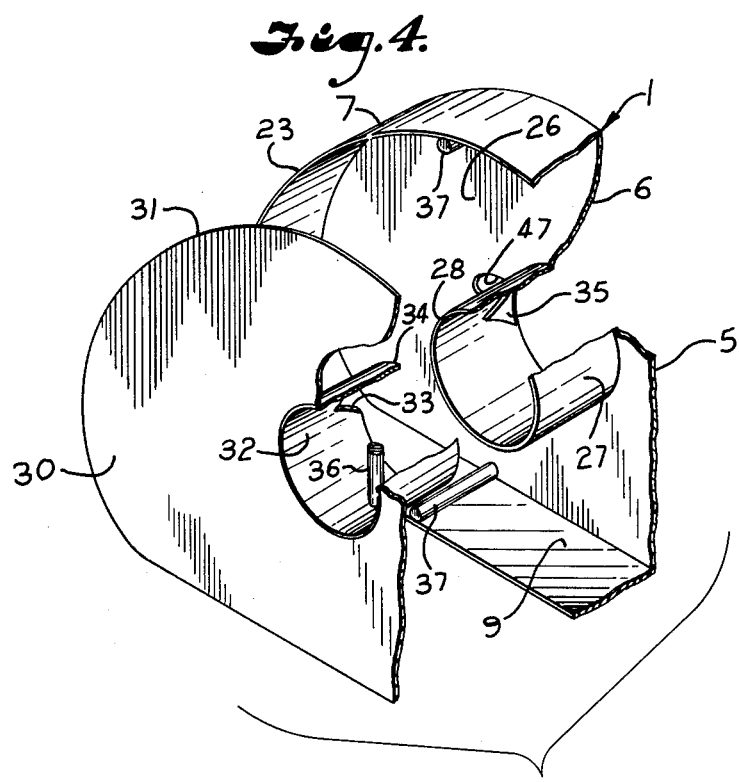

United States Patent Office 3,156,603
Patented Nov. 10, 1964

3,156,603
TAPE DISPENSER
Clifford C. Robinson, 5217 Woodland, Kansas City, Mo.
Filed Jan. 2, 1962, Ser. No. 163,928
2 Claims. (Cl. 156—577)

This invention relates to a tape dispenser, and more particularly a device of this character adapted for dispensing masking tape and the like.

Adhesive tape dispensers have heretofore been devised; however, such devices have been poorly adapted for dispensing masking tape. Masking tape is commonly and liberally used in the painting of cars, window casings, interior walls and the like to protect surfaces which are not to be painted while permitting free paint application to adjacent surfaces. In applying the tape to the surface which will remain unpainted, extreme care was heretofore necessary to insure that the edge of the tape was applied closely adjacent the desired line of demarcation between the respective painted and unpainted surfaces. In addition, the manual handling of the tape often resulted in damage to the tape adhering surface whereby the tape did not stick properly where placed.

It is the principal objects of the present invention to provide a tape dispenser adapted to apply masking tape closely adjacent an abutting surface extending outwardly of a surface to be painted; to provide such a device which lays the tape in a straight or curved line with little effort on the part of the operator; to provide such a device which includes a rest for the index finger to permit ease and accuracy of control by the operator; to provide such a device which is comprised of extremely thin side walls uniquely reinforced to produce a rigid serviceable structure; to provide a tape dispenser which is easily loaded and includes a window for determining the need for an additional supply of tape; to provide such a device which includes a pair of spaced guide rollers one of which also acts as a tape applying roller; and to provide a tape dispenser construction which is simple in design and rugged and reliable in use.

Other objects and advantages of this invention will become apparent from the following description taken in connection with the accompanying drawings wherein are set forth by way of illustration and example certain embodiments of this invention.

FIG. 3 is a cross-sectional view taken on the line 3—3, FIG. 2.

FIG. 4 is a fragmentary exploded perspective view illustrating the assembly of the dispenser cover and dispenser case.

Figure 1:
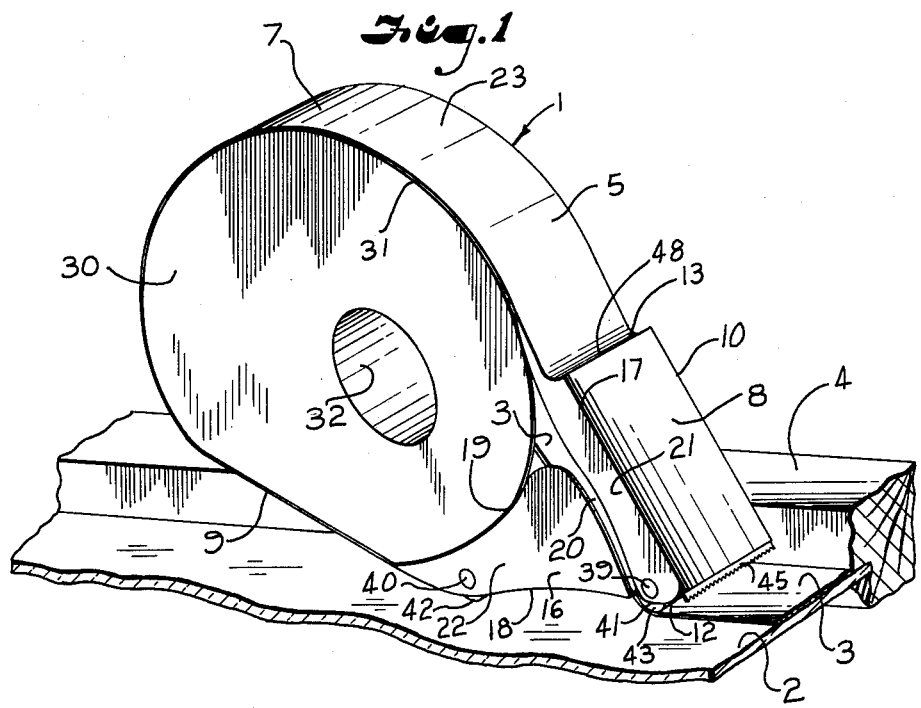
FIG. 1 is a perspective view of a tape dispenser embodying features of this invention.
Figure 2:
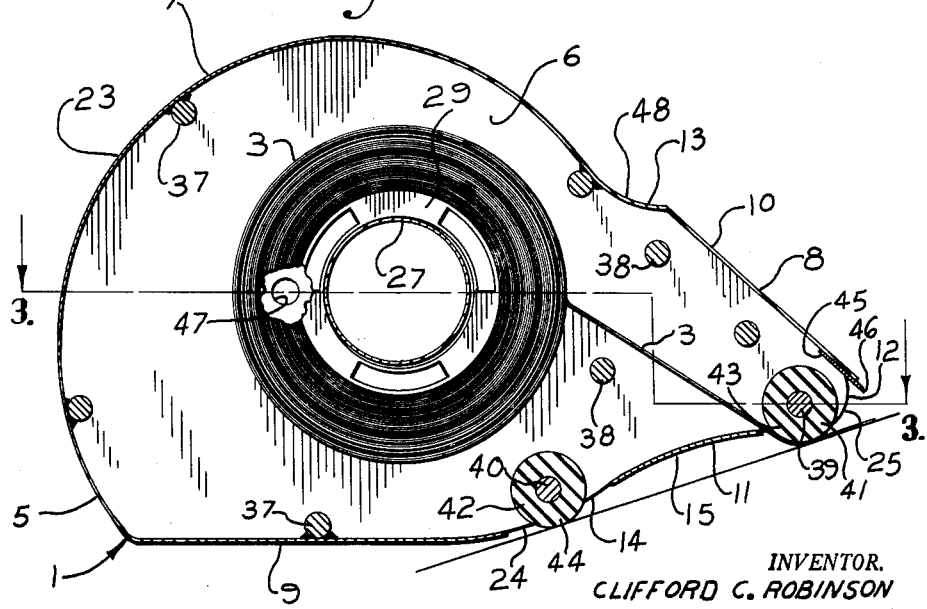
FIG. 2 is a cross-sectional view in side elevation illustrating the interior of the tape dispenser.

Referring to the drawings in more detail:

The reference numeral 1 generally indicates a tape dispenser embodying features of this invention. The tape dispenser 1 is shown (FIG. 1) in tape-dispensing position on a surface, in the illustrated example a window pane 2, for dispensing masking tape 3 closely adjacent the window frame 4 which presents an abutment extending outwardly from the pane 2.

The tape dispenser 1 comprises a case 5 having a first side wall 6 of very thin cross-section, for example $\frac{1}{32}$-inch. The side wall 6 has a generally circular rear edge portion 7 and an inwardly tapered front edge portion 8. The rear edge portion 7 includes a generally flat lower edge 9. The front edge portion 8 includes an upper edge section 10 and a lower edge section 11 terminating in a rounded point 12. The upper edge section 10 has a concave part 13 located between the rear edge portion 7 and the front edge portion 8. The lower edge section 11 has a shallow convex part 14 located between the lower edge 9 and the lower edge section 11. The lower edge section 11 includes a shallow concave part 15 located between the rounded point 12 and the convex part 14.

A second wall 16 is of very thin cross-section comparable in thickness to that of the side wall 6 and is spaced from and parallel to said side wall 6. The wall 16 is of generally triangular form and has an upper edge section 17 and a lower edge section 18 respectively substantially similar to and laterally aligned with the upper edge section 10 and lower edge section 11 of the wall 6. The wall 16 has a rear edge 19 of concave shape and disposed on substantially the same radius as the circular part of the rear edge portion 7.

The wall 16 has a slot 20 extending thereacross and dividing same into an upper segment 21 and a lower segment 22.

An end wall 23 of greater cross-sectional thickness than the side walls 6 and 16 connects the walls 6 and 16 between the upper edge sections 10 and 17 and between the shallow concave part of the lower edge sections 11 and 18. Spaced rear and forward slots or openings 24 and 25 are respectively maintained between the side walls 6 and 16 at the convex part 14 and the rounded point 12. The end wall 23 continues around the rear edge portion 7 of the side wall 6 defining a generally circular opening 26 with the second wall rear edge 19.

A cylindrical tubular tape-receiving core 27 projects inwardly of the case 5 from the side wall 6 and terminates in an end 28 which rests in the plane containing the inside surface of the side wall 16. The core 27 is adapted to receive a supply of tape 3 mounted on a conventional retainer 29. Suitable clearance is maintained between the retainer 29 and the core 27 to permit the supply of tape to rotate for dispensing in a manner described hereinafter.

A generally circular cover wall 30, which is as thin in cross-section as the side walls 6 and 16, has an outer edge 31 substantially corresponding to but slightly smaller than the generally circular opening 26. A cylindrical tubular core 32 projects inwardly from the cover wall 30 and has an outside diameter whereby the core 32 is adapted to be snugly slidably received coaxially within the core 27 for supporting the cover wall 30 in the circular opening 26. A triangular notch 33 is formed in the unsupported end 34 of the core 32. A projection 35 consisting of a triangular-shaped plate or the like is secured to the core 27 and is adapted to be received in the notch 33 for aligning the cover wall 30 with the circular opening 26. A bar 36 extends diametrically across the interior of the core 32 to provide a finger-contacting member for urging the cover wall 30 outwardly with respect to the case 5.

A plurality of peripheral reinforcing rods 37 are respectively welded to the side wall 6 and the end wall 23 to add additional rigidity to the case 5. Similar reinforcing rods 38 are respectively secured to and between the side wall 6 and the side wall 16 and help maintain the proper spaced relationship therebetween, under load. It is noted that the curvature of the end wall portions connected at 13 and 15 provide additional rigidity to the case 5 which is highly desirable due to the thin cross-section of the side walls 6 and 16.

A front fixed axle 39 and a rear fixed axle 40 extend between and are secured to the side walls 6 and 16 adjacent the respective openings 25 and 24. The axles 39 and 40 are preferably fixed by welding to the respective side walls, taking care to leave the outside surfaces of the side walls smooth. A front roller 41 preferably of rubber is rotatably mounted on the front axle 39 for rotation in a vertical plane extending longitudinally of the case 5 when positioned as illustrated in FIG. 1. A rear roller 42 of the same material as the roller 41 is rotatably mounted on the rear axle 40 for rotation in the same plane. The rollers 41 and 42 respectively have a portion 43 and 44 extending externally of the case 5 regardless of the rotational positions thereof on the respective axles 39 and 40.

A tape-cutting member 45 is secured to the end wall 23 between the side walls 6 and 16 and has a serrated edge 46 extending outwardly of the case 5 through the opening 25.

A bore 47 extends through the side wall 6 adjacent the outer surface of the retainer 29 to enable the user of the tape dispenser 1 to visually observe when the supply of tape 3 is reduced to a point near depletion.

In operation, the end wall 23 adjacent the concave part 13 forms a receiver or abutment 48 against which the index finger (not shown) of the user may rest. The extremely thin walls 6 and 16, as well as the thin cover wall 30, permit a tape width to be used which is substantially equal to the outside width of the case 5. This permits one edge of the tape 3 to be applied on a surface closely adjacent an abutment extending outwardly from the surface, in the illustrated example the window frame 4. The spaced rollers 42 and 43 provide stable mobile support for the case 5 as it is pulled along the pane 2 in sliding contact with the window frame 4.

If it is desired to lay the tape 3 in a curved path, it is only necessary to raise the rear portion of the case 5 so that all downward pressure is supported by the front roller 41. This permits ease of following a curved path while dispensing tape and yet very small clearance may be maintained adjacent an abutment extending upwardly from the surface upon which the tape is applied.

In replacing an exhausted retainer 29 with a retainer having a full supply of tape thereon, it is only necessary to separate the cover wall 30 from the case 5 by pressing on the bar 36, remove the exhausted retainer 29, place a new supply of tape over the core 27 and thread a length of the tape 3 into the slot 20 and underneath the front roller 41. The cover wall 30 may then be replaced, the entire operation taking only a few seconds.

The interaction between the spaced rollers 41 and 42 will aid the user of the tape dispenser 1 in laying tape in a straight line without any guiding surfaces contacting the side walls 16 or 6 if this is desired. The tape dispenser is operable with one hand, leaving the other hand free, for example, to hold portions of torn paper (not shown) together for applying repairing tape thereon. It is to be understood that when the length of tape desired has been applied, it is only necessary to rock the rear of the case 5 upwardly and pull the terminating end of the applied tape against the serrated edge 46 to sever the tape. The end of the tape remaining with the tape dispenser adheres to the serrated edge 46 presenting the beginning of the tape exposed over the portion 43 of the roller 41. It is thus apparent that the tape need not be touched at any time during the application of a plurality of strips.

It is to be understood that for greatest advantage the width of the tape dispenser 1 should correspond to the particular width of tape desired to be dispensed. It is to be further understood that while one form of this invention has been illustrated and described, it is not to be limited to the specific form or arrangement of parts herein described and shown except insofar as such limitations are included in the claims.

What I claim and desire to secure by Letters Patent is:

1. A hand held tape dispenser adapted to lay strips of pressure sensitive adhesive tape on a surface selectively in a straight path and a curved path and closely adjacent an abutting surface extending outwardly from said surface comprising:
   (a) an integral case having a forward portion and first and second spaced parallel thin side walls, said side walls each having an aligned peripheral edge,
   (b) said integral case including an end wall extending between and connecting said side walls at said peripheral edges,
   (c) a pair of spaced interrupted portions on said end wall respectively forming a forward opening at said forward portion and a rear opening spaced rearwardly of said forward opening,
   (d) means associated with said first side wall for rotatably supporting a supply of pressure sensitive adhesive tape in said case,
   (e) forward and rear parallel axles fixed at opposite ends thereof to said first and second side walls and extending between said first and second side walls respectively adjacent said forward and rear openings, and
   (f) a tape laying roller on said forward axle and a guide roller on said rear axle, said rollers respectively having a portion extending through said respective openings and projecting externally of said case,
   (g) said end wall between said interrupted portions being recessed behind said roller portions allowing simultaneous contact of said roller portions on said surface for guiding said guide roller simultaneously with straight path tape laying by said tape laying roller, said dispenser being selectively tilted upwardly about said tape laying roller for disengaging said guide roller from said surface for curved path tape laying.

2. The dispenser as set forth in claim 1 wherein:
   (a) said second wall terminates rearwardly of said forward portion forming a tape receiving opening with said end wall, said second wall being divided into an upper segment and a lower segment, said segments being spaced apart forming a slot therebetween, said slot communicating with said forward opening and said tape receiving opening for ease in threading tape beneath said tape laying roller.

References Cited in the file of this patent

UNITED STATES PATENTS

| | | |
|---|---|---|
| 1,408,499 | Casterline et al. | Mar. 7, 1922 |
| 2,362,640 | Krueger | Nov. 14, 1944 |
| 2,569,140 | Avery | Sept. 25, 1951 |
| 2,683,547 | Fisher | July 13, 1954 |
| 2,759,545 | Rizza | Aug. 21, 1956 |
| 2,980,564 | Wiedemann | Apr. 18, 1961 |

FOREIGN PATENTS

| | | |
|---|---|---|
| 846,594 | Great Britain | Aug. 31, 1960 |